United States Patent [19]

Kaifu et al.

[11] Patent Number: 4,908,184
[45] Date of Patent: * Mar. 13, 1990

[54] HIGH STRENGTH, CORROSION-RESISTANT ALUMINUM ALLOYS FOR BRAZING

[75] Inventors: Masaharu Kaifu, Yamaguchi; Jun Takigawa, Tochigi; Hideo Fujimoto, Tochigi; Tomohiro Nishimura, Tochigi; Masao Takemoto, Tochigi, all of Japan

[73] Assignee: Kabushiki Kaisha Kobe Seiko Sho, Kobe, Japan

[*] Notice: The portion of the term of this patent subsequent to Nov. 29, 2005 has been disclaimed.

[21] Appl. No.: 198,215

[22] Filed: Aug. 5, 1988

Related U.S. Application Data

[63] Continuation of Ser. No. 884,655, Jul. 15, 1986, Pat. No. 4,788,037, which is a continuation of Ser. No. 556,594, Nov. 30, 1983, abandoned.

[30] Foreign Application Priority Data

Nov. 30, 1982 [JP] Japan ................... 57-210508

[51] Int. Cl.$^4$ ........................................... C22C 21/16
[52] U.S. Cl. ................................. 420/534; 420/535
[58] Field of Search ............... 420/534, 535; 148/417, 148/439

[56] References Cited

U.S. PATENT DOCUMENTS 4,788,037 11/1988 Kaifu et al. .................... 420/534

Primary Examiner—R. Dean
Attorney, Agent, or Firm—Oblon, Spivak, McClelland, Maier & Neustadt

[57] ABSTRACT

A high strength, corrosion-resistant alloy for brazing is disclosed, which alloy comprises 0.2–1.0 wt % of Cu, 0.1–0.5 wt % of Mg, 0.2–1.0 wt % of Si, and the balance of Al and inevitably present impurities. The weight ratio of Si/Mg is in the range of 1–2.5:1. The alloy may further comprise 0.03–0.5 wt % of Ni and/or one or more of Zr, Cr and Mn each in an amount of 0.05–0.5 wt %.

4 Claims, 1 Drawing Sheet

HIGH STRENGTH, CORROSION-RESISTANT ALUMINUM ALLOYS FOR BRAZING

The present application is a continuation of application Ser. No. 06/884,655, now U.S. No. 4,788,037, which latter application is a file wrapper continuation application of application Ser. No. 06/556,594, now abandoned.

BACKGROUND OF THE INVENTION

1. Field of the Invention

This invention relates to the brazing art and more particularly, to high strength and corrosion-resistant aluminum alloys for brazing which exhibit high strength after brazing and are excellent in corrosion resistance.

2. Description of the Prior Art

Brazing of aluminium or aluminium alloys thereof has been widely effected mainly on heat exchanges of automobiles. For instance, aluminium materials of 1000 and 3000 series are now applied to condensers and evaporators for car air conditioners and to oil coolers for engines.

In recent years, furthermore, use of aluminium alloys in automobile radiator is increasing. Because high strength is needed for automobile radiator material, Al-Mn-Mg alloys of 3000 series or alloys of 6000 series are currently used.

Especially, 6000 series alloys are heat treatable aluminium alloys, of which 6951 alloy, which is a high strength alloy for brazing is standardized as a core material for brazing sheet in the JIS and AA standards and is mainly applied as a header material for automobile radiator.

However, this 6951 alloy is apt to be attacked by filler metal at brazing. Although the alloy is slightly better in corrosion resistance than other alloys having almost the same level of strength, its resistance to corrosion is much lower than as required.

Moreover, in heat exchangers for use in automobiles, there is a strong demand of rendering a material as thin as possible in order to make light and compact heat exchangers. This, in turn, highly requires an aluminium alloy which is high in strength and excellent in corrosion resistance.

SUMMARY OF THE INVENTION

It is an object of the present invention to provide a high strength, corrosion-resistant aluminium alloy which satisfies the above-described requirements and can thus overcome the problems involved in currently employed 6951 alloy.

It is another object of the invention to provide a high strength, corrosion-resistant aluminium alloy which has a higher strength than the 6951 alloy and is much improved in corrosion resistance.

The above objects can be achieved, according to the present invention, by a high strength, corrosion-resistant alloy for brazing which comprises 0.2–1.0 wt% of Cu, 0.1–0.5 wt% of Mg, 0.2–1.0 wt% of Si, and the balance of Al and inevitably present impurities, the ratio by weight of Si/Mg being 1–2.5. The alloy may further comprise one or more elements selected from the group consisting of Zr, Cr and Mn. These elements are each used in an amount of 0.05–0.5 wt%. Alternatively, the alloy may further comprise 0.05–0.5 wt% of Ni in addition to or without addition to the one or more elements mentioned above.

DETAILED DESCRIPTION AND EMBODIMENTS OF THE INVENTION

Figure 1A:
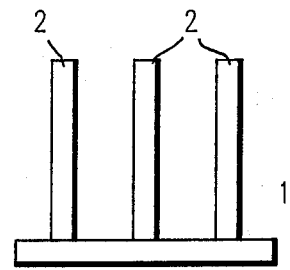
FIGS. 1(a) through 1(c) are illustrative views showing the manner of measuring a degree of penetration of a filler metal material into a core material.

The alloy components and contents thereof in the high strength, corrosion-resistant aluminium alloy according to the invention are described.

Cu is known to improve the strength of aluminium alloys but is considered to considerably impede the corrosion resistance. According to our experimental results, however, it was found that deterioration of the corrosion resistance could be minimized when the alloys were heated upon brazing. In addition, Cu serves to make the electrochemical potential noble, so that when used in combination with ordinary aluminium alloys, the cathodic protection effect results. Accordingly, when Cu is contained in coexistence with Mg and Si in an amount exceeding 1.0 wt%, the resulting alloys cannot be prevented from deterioration in corrosion resistance even after heated at brazing. On the contrary, when the content of Cu is smaller than 0.2 wt%, the electrochemical potential cannot be transferred to the noble state and high strength cannot be ensured. Thus, the content of Cu is in the range of 0.2–1.0 wt%. Preferably, the content is in the range of 0.3–0.9 wt%. When, for example, a Cu-containing aluminium alloy is used as main members for coolant passage such as tubes, header plates, tanks and the like in a radiator in combination with pure aluminium or ordinary aluminium alloys such as 3000 or 6000 series alloys used as submembers such as fins, the electrochemical potential of the Cu-containing aluminium alloy becomes noble. As a consequence, the fins serve as a sacrificial anode, thus suppressing the Cu-containing aluminium alloy from corrosion.

Mg is an element which forms an intermetallic compound, $Mg_2Si$, in combination with Si thereby imparting age hardenability to the resulting alloy. This element is known as a main component of the 6000 series alloy. When Mg is contained in large amounts, the brazing property deteriorates. This leads to more susceptibility to penetration of a filler metal with a lowering of corrosion resistance. In this sense, the content of Mg should be below 0.5 wt%. In order to improve the age hardening strength, the content of Mg should exceed 0.1 wt%. Accordingly, the content of Mg is in the range of 0.1–0.5 wt%, preferably 0.1–0.45 wt%.

Si is an element which can impart age hardenability by formation of an intermetallic compound, $Mg_2Si$, in combination with Mg. Similar to Mg, this element is known as one of main components of the 6000 series alloys. Si gives a much less influence on the brazing property and shows much lower degrees of penetration of filler metal and a lowering of corrosion resistance then Mg. Additionally, when Si is used in excess of the theoretical amount of Si determining the weight ratio of Si and Mg used to form the intermetallic compound of $Mg_2Si$, the aged strength can be improved. However, when the content of Si is as great as over 1.0 wt%, filler metal is apt to penetrate at the time of brazing, and the brazing property and corrosion resistance cannot be suppressed from lowering. On the contrary, when the content is smaller than 0.2 wt%, the strength by age hardening cannot be improved. Accordingly, the content of Si is in the range of 0.2–1.0 wt%.

The weight ratio of Si/Mg is in the range of 1–2.5. This is because when the Si/Mg ratio is smaller than 1, penetration of filler metal at the time of brazing occurs considerably with considerable lowerings of the brazing property and the corrosion resistance. Likewise, when the Si/Mg ratio exceeds 2.5:1, the corrosion resistance and brazing property lower. Accordingly, the weight ratio of Si/Mg should be higher than the theoretical ratio of the $Mg_2Si$ intermetallic compound (the Si/Mg ratio in $Mg_2Si$ is 0.58) and is generally in the range of 1–2.5. Preferably, the weight ratio is in the range of 1.25–2.5 and most preferably, in the range of 1.3–2.3. Thus, Si should be used in excess in order to improve especially the corrosion resistance.

The following elements may also be added to the aluminium alloy according to the invention.

Zr forms, in combination with aluminium, an intermetallic compound, $ZrAl_3$, which is finely distributed and serves to reinforce subgrains thereby suppressing recrystallization. When rolled or extruded, the compound is converted to have a fibrous structure. When heated at the time of brazing, crystal grains do not turn into equi-axis crystals, but form flat grains elongated along the direction of processing. Therefore, penetration of filler metal is suppressed and the susceptibility to intergranular corrosion is improved. In this connection, however, when the content is below 0.05 wt%, the abovementioned effects cannot be expected. When Zr is contained in an amount exceeding 0.5 wt%, giant intermetallic compounds are formed with the attendant lowering of processability. Accordingly, the content of Zr is in the range of 0.05–0.5 wt%.

Similar to Zr, Cr and Mn serve to reinforce subgrains and suppress recrystallization with a further advantage of enhancing the drawing processability. These effects cannot be expected when the content of each element is below 0.05 wt%. On the contrary, when the content exceeds 0.5 wt%, coarse particles of the intermetallic compound are formed, resulting in a lower of processability and also in a increasing of the susceptibility to intergranular corrosion. Accordingly, contents of Cr and Mn should be in the range of 0.05–0.5 wt%, respectively.

Ni is an element which contributes to improve strength and serves to transfer the electrochemical potential toward the noble direction. The above effects are reduced when the content is below 0.05 wt%. With a content over 0.5 wt%, penetration of filler metal increases. Accordingly, the Ni content is in the range of 0.05–0.5 wt%.

The high strength, corrosion-resistant aluminium alloys of the present invention comprise, aside from a major proportion of aluminium along with inevitably present impurities, the above-described components in amounts defined before. Furthermore, the present inventive alloy may contain up to 0.1 wt% of Ti, in order to prevent hot cracking during casting. Filler metals which are applicable to the aluminium alloys are Si-containing aluminium alloys. Examples of such Si-containing aluminium alloys are as follows.
1. Vaccum Brazing Method
  Al-Si-Mg alloys, Al-Si-Mg-Bi alloys
2. Flux Brazing Method
  Al-Si alloys
3. Atmospheric Brazing Method
  Al-Si-Bi-alloys The filler metal is suitably selected depending on the brazing method. The content of Si in the alloys may vary depending on the type of alloy to be applied and the purpose and is generally in the range of 7–12 wt%.

Thus, the filler metal which is applied to the high strength, corrosion-resistant aluminium alloys of the invention is conveniently an Si-containing aluminium alloy. This filler metal is used, as a skin material, by cladding on opposite surfaces or one surface of a part or member of the aluminium alloy of the invention.

The high strength, corrosion-resistant aluminium alloys of the invention may be satisfactorily used either as a core material of an aluminium alloy brazing sheet, or as a bare sheet.

The present invention is described by way of example in which a number of high strength, corrosion-resistant aluminium alloys of the invention are tested along with comparative alloys.

EXAMPLE

Aluminium alloys having metal elements and contents indicated in Table 1 were prepared by an ingot technique, from which test samples were made. In Table 1, alloys of Sample Nos. 1–9 are high strength, corrosion-resistant alloys of the invention, alloys of Sample Nos. 10–14 are comparative alloys, an alloy of Sample No. 15 is JIS 6951 alloy, and an alloy of Sample No. 16 is JIS 3003 alloy.

The alloys indicated in Table 1 were used to make 1.2 mm thick samples of the bare alloys and brazing sheets which were clad on one side thereof with filler metals made of an Al-10 Si-1.5 Mg alloy in a cladding ratio, of 10%.

1. Mechanical Properties After Heating for Brazing

The sample alloys were each heated under a vacuum of $5 \times 10^{-5}$ Torr, at 595° C. for 2 minutes and subsequently cooled down to room temperature at a cooling rate of 27° C./minute. Each of the thus treated samples was used to make a JIS NO. 5 test piece for tensile test. The results are shown in Table 2.

Figure 1B:
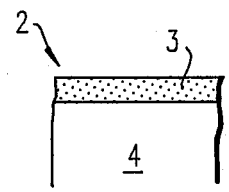
Figure 1C:
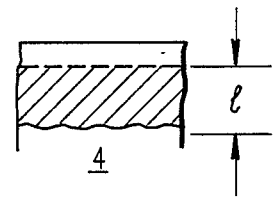

2. Degree of Penetration of Filler Metal Into Core Material at the Time of Brazing A brazing sheet 1 and 3003 alloy members 2 are arranged, as shown in FIG. 1(a), so that the members 2 are vertical with respect to the brazing sheet 1, followed by brazing under a vacuum of $5 \times 10^{-5}$ Torr. at a temperature of 595° C. for 2 minutes. Thereafter, a degree, 1, of penetration of a filler metal 3 into a core material 4 was measured by a metallurgical microscope as shown in FIGS. 1(b) and 1(c). The results are shown in Table 3.

3. Electrochemical Property

The test samples of (1) were each subjected to the measurement of a corrosion potential in an open-to-air 0.5N NaCl solution of 20° C. using a saturated calomel electrode (S.C.E.) as a reference electrode. The results are shown in Table 4 (mV vs S.C.E.)

4. Corrosion Test

The test samples of (2) were subjected to the CASS test as prescribed in JIS H 8681, thereby measuring a maximum penetration depth after 100 hours. The results are shown in Table 5.

TABLE 1

| Sample No. | Cu | Mg | Si | Zr | Cr | Mn | Ni | Si/Mg | Remarks |
|---|---|---|---|---|---|---|---|---|---|
| 1 | 0.5 | 0.3 | 0.45 | — | — | — | — | 1.5 | Inventive alloy |
| 2 | 1.0 | " | " | — | — | — | — | " | " |
| 3 | 0.5 | 0.2 | 0.5 | — | — | — | — | 2.5 | " |
| 4 | " | 0.3 | 0.45 | 0.15 | — | — | — | 1.5 | " |
| 5 | " | " | " | — | 0.15 | — | — | " | " |
| 6 | 0.5 | 0.3 | 0.45 | — | — | 0.3 | — | " | " |
| 7 | " | " | " | 0.15 | 0.15 | — | — | " | " |
| 8 | 0.3 | " | " | " | " | — | — | " | " |
| 9 | 0.5 | " | " | " | " | 0.3 | — | " | " |
| 10 | 1.0 | 0.3 | 0.45 | " | " | — | — | 1.5 | " |
| 11 | 0.5 | 0.3 | 0.45 | — | — | — | 0.3 | 1.5 | " |
| 12 | 0.3 | 0.3 | 0.45 | 0.15 | 0.15 | — | 0.2 | " | " |
| 13 | — | 0.3 | 0.45 | — | — | — | — | 1.5 | Comparative alloy |
| 14 | 0.5 | 0.3 | — | — | — | — | — | — | " |
| 15 | " | — | 0.45 | — | — | — | — | — | " |
| 16 | " | 0.5 | 0.15 | — | — | — | — | 0.3 | " |
| 17 | 0.3 | 0.65 | 0.35 | — | — | — | — | 0.54 | JIS 6951 |
| 18 | 0.15 | — | — | — | — | 1.2 | — | — | JIS 3003 |

TABLE 2

| | Alloy | Tensile Strength Kg/mm² |
|---|---|---|
| 1 | Inventive alloy | 20.1 |
| 2 | Inventive alloy | 24.2 |
| 3 | Inventive alloy | 20.4 |
| 4 | Inventive alloy | 19.8 |
| 5 | Inventive alloy | 20.3 |
| 6 | Inventive alloy | 19.7 |
| 7 | Inventive alloy | 20.4 |
| 8 | Inventive alloy | 18.7 |
| 9 | Inventive alloy | 20.4 |
| 10 | Inventive alloy | 22.8 |
| 11 | Inventive alloy | 21.4 |
| 12 | Inventive alloy | 19.2 |
| 13 | Comparative alloy | 17.0 |
| 14 | Comparative alloy | 14.7 |
| 15 | Comparative alloy | 14.6 |
| 16 | Comparative alloy | 17.6 |
| 17 | JIS 6951 | 19.5 |
| 18 | JIS 3003 | 12.3 |

TABLE 3

| | Alloy | Penetration Depth of Filler Metal into core material (μ) |
|---|---|---|
| 1 | Inventive alloy | 177 |
| 2 | Inventive alloy | 193 |
| 3 | Inventive alloy | 162 |
| 4 | Inventive alloy | 87 |
| 5 | Inventive alloy | 149 |
| 6 | Inventive alloy | 88 |
| 7 | Inventive alloy | 79 |
| 8 | Inventive alloy | 74 |
| 9 | Inventive alloy | 79 |
| 10 | Inventive alloy | 137 |
| 11 | Inventive alloy | 178 |
| 12 | Inventive alloy | 90 |
| 13 | Comparative alloy | 175 |
| 14 | Comparative alloy | 199 |
| 15 | Comparative alloy | 134 |
| 16 | Comparative alloy | 217 |
| 17 | JIS 6951 | 235 |
| 18 | JIS 3003 | 86 |

TABLE 4

| | Alloy | Potential (mV) vs. S.C.E. |
|---|---|---|
| 1 | Inventive alloy | −635 |
| 2 | Inventive alloy | −640 |
| 3 | Inventive alloy | −683 |
| 4 | Inventive alloy | −685 |
| 5 | Inventive alloy | −680 |
| 6 | Inventive alloy | −680 |
| 7 | Inventive alloy | −679 |
| 8 | Inventive alloy | −693 |
| 9 | Inventive alloy | −679 |
| 10 | Inventive alloy | −655 |
| 11 | Inventive alloy | −678 |
| 12 | Inventive alloy | −685 |
| 13 | Comparative alloy | −737 |
| 14 | Comparative alloy | −690 |
| 15 | Comparative alloy | −687 |
| 16 | Comparative alloy | −686 |
| 17 | JIS 6951 | −705 |
| 18 | JIS 3003 | −718 |

TABLE 5

| | Alloy | Maximum Penetration Depth (mm) |
|---|---|---|
| 1 | Inventive alloy | 0.21 |
| 2 | Inventive alloy | 0.19 |
| 3 | Inventive alloy | 0.24 |
| 4 | Inventive alloy | 0.19 |
| 5 | Inventive alloy | 0.17 |
| 6 | Inventive alloy | 0.17 |
| 7 | Inventive alloy | 0.12 |
| 8 | Inventive alloy | 0.43 |
| 9 | Inventive alloy | 0.12 |
| 10 | Inventive alloy | 0.14 |
| 11 | Inventive alloy | 0.20 |
| 12 | Inventive alloy | 0.30 |
| 13 | Comparative alloy | completely penetrated |
| 14 | Comparative alloy | 1.12 |
| 15 | Comparative alloy | 0.96 |
| 16 | Comparative alloy | 1.06 |
| 17 | JIS 6951 | completely penetrated |
| 18 | JIS 3003 | completely penetrated |

As will be apparent from the above example, the high strength, corrosion-resistant alloys of the present invention have the following advantages.

1. The alloys hve higher strength after brazing than the JIS 6951 alloy.
2. The alloys are small in the degree of penetration into the core material at the time of brazing and are thus excellent in brazing property.
3. The alloys are much improved in corrosion resistance over the JIS 6951 alloy.

What is claimed is:

1. A high strength, corrosion-resistant alloy for brazing which consists essentially of 0.5–1.0 wt.% of Cu, 0.1–0.5 wt.% of Mg, 0.2–1.0 wt.% of Si, and one or more of Zr, Cr and Mn each in the amount of 0.05–0.5 wt.%, and the balance of Al and inevitably present impurities, with the weight ratio of Si/Mg being in the range of 1–2.5.

2. The high strength, corrosion-resistant alloy of claim 1, wherein the content of Mg is in the range of 0.1–0.45 wt.%, and the weight ratio of Si/Mg is in the range of 1.25–2.5.

3. The high strength, corrosion-resistant alloy of claim 1, wherein the weight ratio of Si/Mg is in the range of 1.3–2.3.

4. The high strength, corrosion-resistant alloy of claim 1, which contains up to 0.1 wt.% of Ti.

* * * * *